INVENTOR.
ZOLA FOX 3,164,165
RELIEF VALVE FOR USE WITH CRYOGENIC
FLUIDS
Zola Fox, Verona, N.J., assignor to Thiokol Chemical Corporation, Bristol, Pa., a corporation of Delaware
Filed May 11, 1962, Ser. No. 193,919
5 Claims. (Cl. 137—468)

This invention relates in general to valves and has particular reference to poppet-type relief valves such as are used in connection with the fuel pipes of large flow capacity in rockets or the supply lines therefor at ground installations.

The primary object of the invention is to provide a simple poppet relief valve of a construction capable of relatively high response, control sensitivity and temperature insensitivity.

To be more explicit, my improved relief valve comprises a highly stressed low rate helical compression spring to restrain the poppet valve against its seat in combination with extremely simple means to enable exacting initial control of spring rate at the factory, relief pressure adjustment screw means by which changes in preload on the compression spring may be effected manually during operational use of the valve, and bimetallic temperature-sensitive means to cancel out changes in spring rate which otherwise would be caused by variations in temperature of the fluid being conducted through the valve.

It is another object of the invention to provide means by which the relief valve may be actuated remotely to displace the poppet off its seat.

Relief valves for use with cryogenic fluids require special handling in order to insure reliability of function. Reliability can be low in such devices owing to the reduced temperature of liquified gases, such as the liquid oxygen fuel employed in rocket propulsion, and the tendency for moisture precipitation on working parts.

It, therefore, is a further object of the invention to provide a relief valve possessing the above enumerated advantages which is so constructed and arranged that nearly all working parts are exposed to the cryogenic fluid being handled by the valve, while those surfaces which are exposed to the ambient air are coated with a thin spray of fluorcarbon or other similar material to which water has no affinity.

Still further objects, advantages and features will become apparent as the following specific description is read in connection with the accompanying drawings, in which.

Figure 1:
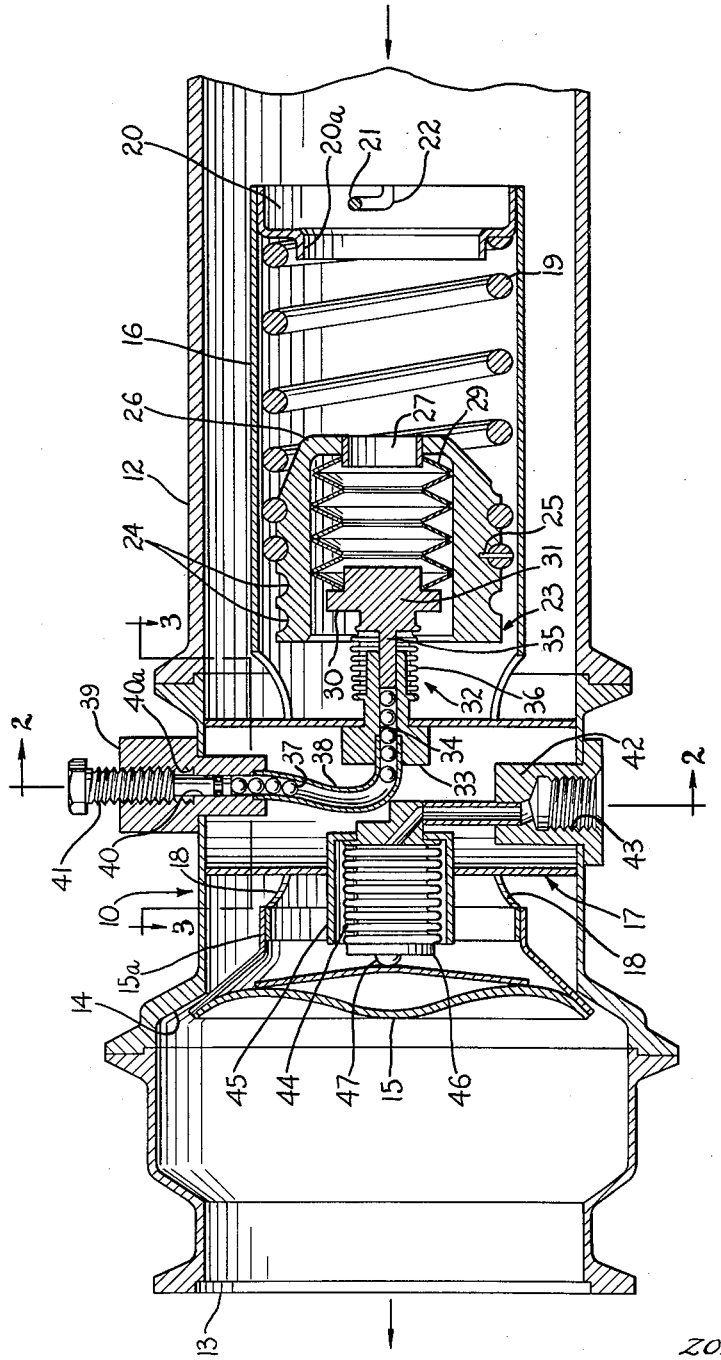
FIGURE 1 is a longitudinal vertical sectional view of a relief valve constructed in accordance with the invention, showing the movable poppet valve member in closed position.

Referring now in detail to the drawings, wherein like reference characters designate corresponding parts in the several views, there is a hollow cylindrical valve body 10 whose upstream end, or inlet, 11 is designed for connection to pipe 12 of a fluid conduction line. Because the valve of this invention is a relief valve, the downstream end, or outlet, 13 of valve body 10 is open to the atmosphere and thus serves as a vent. Inwardly adjacent to outlet 13, valve body 10 is provided with an annular seat 14 for removable poppet-type valve member 15, which is of circular shape and hollow cap-like structure.

Although movable valve member 15 may be of conventional form, it is preferred to make it of comparatively thin sheet metal in the hollow configuration shown in the interest of lightness and strength. An annular flange 15a at the inner side of movable valve member 15 is telescopically fitted onto the downstream end of a thin can-type tension member 16 that extends upstreamward from valve body 10 in coaxial relation to said body. Movable valve member 15 and tension member 16 thus are substantially integral in construction.

A tubular strut 17 of streamline cross-section extends diametrically between the lateral walls of valve body 10 through a diametrically opposed pair of longitudinal slots 18—18 in tension member 16. The relative dimensions of strut 17 and slots 18—18 are such that sufficient play for axial reciprocation of movable valve member 15 and tension member 16 in relation to valve body 10 and valve seat 14 is permitted. The opposite ends of strut 17 are anchored to the lateral walls of valve body 10 in fluid-tight manner by suitable means to isolate the interior of said strut from the fluid contained in pipe 12, which fluid, as suggested, may be cryogenic in nature.

The upstream end of tension member 16 is open so that the conducted fluid may flow freely through the interior of said member and laterally outward through slots 18—18 into the region of valve seat 14. Consequently, when the fluid is cryogenic, the movable parts mounted inside tension member 16, to be described presently, will be immersed in said fluid.

Movable valve member 15 is restrained against its seat 14 by a highly stressed low rate helical compression spring 19 which is interposed in effect between stop means 20 provided at the upstream end of tension member 16 and strut 17. Stop means 20 is shown to be preferably in the form of a stamped sheetmetal ring which permits free access of conducted fluid to the interior of tension member 16. Stop ring 20 has a reduced inner portion, or flange, 20a which is adapted to fit inside the upstream end of compression spring 19 in centering relation thereto. Suitable means, such as the pin 21 and bayonet slot 22 device, serves to secure stop ring 20 in assembled relation to tension member 16. The downstream end of compression spring 19 does not exert pressure by direct contact with strut 17, but through intervening parts which will now be described.

Rate adjustment means for compression spring 19 includes a tubular member 23 which has a helical semi-circular thread 24 machined in its outer peripheral face to engage the downstream end portion of said spring to enable exacting initial control of spring rate at the factory, which is achieved by screwing spring 19 on or off tubular member 23 to change the number of active unanchored coils until the desired spring rate is obtained. Suitable means, such as pin 25 may be used to lock spring 19 relative to tubular member 23 once the desired rate adjustment has been obtained.

An internal flange 26 is provided on the upstream end of tubular member 23 and a sleeve 27 is pressed into the orifice formed by flange 26 in a manner to provide an inwardly projecting lip.

In series with compression spring 19 is a stack of belleville type washers 29 fabricated of bimetallic material which are mounted in the interior of tubular member 23 with the upstreamward washer of the stack encircling the projecting lip of sleeve 27. These washers 29 are sized in thickness and diameters such that thermal changes in rate of compression spring 19 will be cancelled out. (Decreasing the temperature of a spring results in an increase of the modulus of its material. This increases the rate and the preload or setting. Upon lowering of the temperature, the bimetallic washers deflect a sufficient amount to negate the increase in preload.)

The downstreamward washer 29 of the stack abuts the external flange 30 of the axially movable head 31 of axial thrust means 32 supported by strut 17. Thrust means 32 includes a bushing 33 which is mounted centrally in the upstream wall of strut 17 in hermetically sealed relation to said wall in order to prevent conducted fluid from penetrating the interior of said strut. Bushing 33 has an axial through bore 34 and head 31 is provided with a central stem 35 slidably engaged with said bore to permit axial adjustment of said head with consequent exertion of relief pressure adjustment thrust on compression spring 19 through the medium of the stack of belleville washers 29 and tubular member 23. A corrugated bellows element 36 encloses the joint between movable head 31 and bushing 33 and is sealed in its connection to said head and bushing to prevent conducted fluid from leaking through bore 34 into strut 17.

Figure 2:
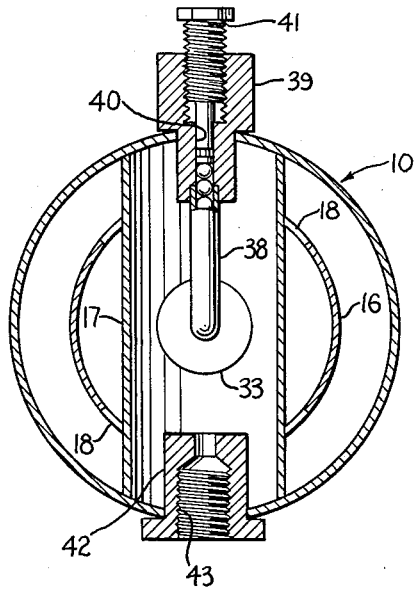
FIGURE 2 is a transverse vertical section taken on line 2—2 of FIGURE 1.
Figure 3:
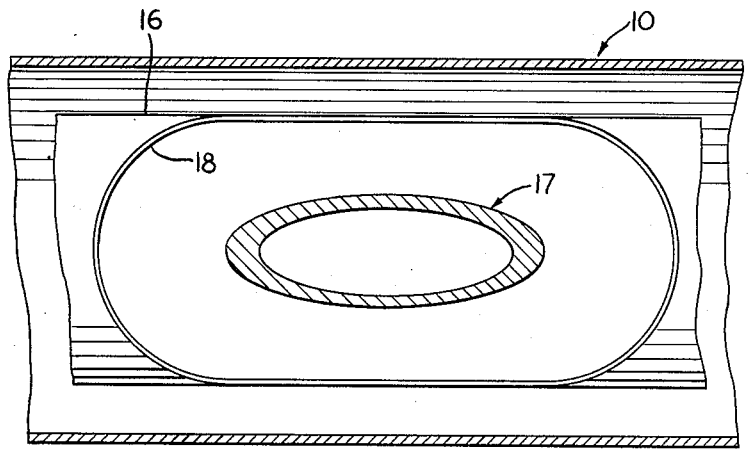
FIGURE 3 is a fragmentary horizontal section on line 3—3 of FIGURE 1.

Relief pressure adjustment means for manually controlled exertion of axial thrust on head 31, may be of any conventional kind, but preferably is in the form suggested in the drawings (FIGURES 1 and 2) wherein a train of loose balls 37 extends from the inner end of stem 35 of head 31 through a curved tube 38 leading radially outward through the interior of strut 17 to the inner end portion of a radial bushing 39 which pierces the lateral wall of valve body 10. Bushing 39 has a through bore 40 whose outer end portion 40a is enlarged and internally screwthreaded for engagement by an adjusting screw 41. The inner end of adjusting screw 41 is dimensioned to fit rotatably and slidably in the inner end portion of bore 40 thereof. The train of balls 37 should be of such length that its outermost ball will contact the inner end of adjusting screw 41 when the latter is at substantially the midpoint of its travel.

Means by which movable valve member 15 may be actuated remotely to effect relief of the pressure in pipe 12 includes a fitting 42 which is installed in the lateral wall of valve body 10 at the end of strut 17 opposite to bushing 39 and has a screw threaded inlet port 43 for connection to a vent control pipe line (not shown) through which gas pressure may be admitted. A suitable conduit 43a leads from inlet port 43 to the interior of a bellows chamber 44 mounted in the downstreamwardly opening shield 45 which is countersunk in the wall of strut 17 axially opposite to bushing 33 of thrust means 32. Bellows chamber 44 has sufficient radial clearance from the lateral wall of shield 45 to permit free axial expansion and contraction of said bellows chamber under the influence of gas pressure changes in the vent control pipe line. The inner, upstream, end of bellows chamber 44 is sealed in its connection to the corresponding base end wall of shield 45 and a cap 46 sealed to the opposite, downstream, end of said chamber has a button 47 adapted to contact the center of movable valve member 15 when the chamber is distended by intentional application of gas pressure through inlet port 43.

*Operation*

At the factory, the rate of compression spring 19 is adjusted initially by screwing the downstream end of said spring onto tubular member 23 to the desired degree, and the spring is locked in this position by pin 25. Then, stop ring 20 is fitted into the upstream end of tension member 16 and spring 19 and is locked in position by pin 21 and bayonet slot 22.

Following installation of the relief valve in a fluid supply pipe 12, the desired operational rate adjustment of compression spring 19 may be set by turning screw 41 in bushing 39 until the said spring is compressed to the desired degree.

At all times, the stack of belleville washers 29 will effect compensation for the influence of fluid temperature changes on compression spring 19.

Whenever it becomes necessary to crack the relief valve by remote control, gas pressure is admitted to bellows chamber 44 through inlet port 43.

It should now be apparent that all of the working parts in tension member 16 and the exterior surfaces of bellows chamber 44 are exposed to the conducted fluid, so that, if that fluid be cryogenic, the exposed parts will operate freely and reliably. Those exterior faces of the valve which are exposed to the atmosphere, such as the downstream face of movable valve member 15, are coated by a protective spray of fluorocarbon or the like.

While there have been shown and described and pointed out the fundamental novel features of this invention as applied to a few structural embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. A relief valve for use with cryogenic fluids comprising a tubular valve body of circular cross-section having upstream inlet and downstream outlet ends and an annular downstreamwardly facing valve seat located inwardly adjacent to said outlet end, a poppet-type movable valve member mounted for axial movement in the valve body and being constructed and arranged to fit tightly against the valve seat of said body in closed position, a thin can-type tension member of tubular construction extending axially upstreamward from the movable valve member with its downstream end in closed connection to said member and its upstream end open to flow of the conducted fluid stream to immerse internal working parts therein, said tension member being provided with diametrically opposed longitudinal slots in its side wall, a backing strut extending laterally through the slots in the tension member in spaced relation to the ends of said slots to permit axial play therein, the ends of the backing strut being anchored in the valve body, stop means located at the upstream end of the tension member, a helical compression spring extending axially inside the tension member in interposed relation to said stop means and backing strut to restrain the movable valve member against its seat, spring rate initial adjustment means including an open-ended tubular member arranged coaxial with respect to the tension member and contained compression spring and being of a diameter to fit inside said spring, the said tubular member being provided with a semicircular helical thread in its outer periphery to engage downstream end convolutions of the compression spring, whereby the effective length of the active freely compressible portion of said spring may be predetermined to achieve spring rate adjustment, axial thrust means interposed between the said tubular member and the backing strut, said backing strut being hollow with its interior sealed from the flow path for cryogenic fluid in the valve body and can-type tension member, and wherein the axial thrust means includes a tubular bushing integral with said strut and having an axial through bore, a head projecting into the interior of the tubular member of the spring rate adjustment means and exerting thrust against said member, said head being axially adjustable toward and away from the tubular bushing on the backing strut, and relief pressure adjustment means extending through the interior of said strut and the lateral wall of the valve body and being constructed and arranged to permit axial adjustment of said head.

2. The invention defined in claim 1, wherein the head of the axial thrust member has an external annular flange axially movable inside the tubular member of the spring rate adjustment means and said tubular member has an internal annular flange at its upstream end axially opposed to the external flange on said head, and wherein temperature compensator means is interposed between said opposed flanges.

3. The invention defined in claim 2, wherein the temperature compensator means is a stack of belleville-type washers of bimetallic material.

4. The invention defined in claim 3, wherein a corrugated fluid-sealing bellows encloses the joint between the movable head and the strut bushing.

5. A relief valve for use with cryogenic fluids comprising a tubular valve body of circular cross-section having upstream inlet and downstream outlet ends and an annular downstreamwardly facing valve seat located inwardly adjacent to said outlet end, a poppet-type movable valve member mounted for axial movement in the valve body and being constructed and arranged to fit tightly against the valve seat of said body in closed position, a thin can-type tension member of tubular construction extending axially upstreamward from the movable valve member with its downstream end in closed connection to said member and its upstream end open to flow of the conducted fluid stream to immerse internal working parts therein, said tension member being provided with diametrically opposed longitudinal slots in its side wall, a backing strut extending laterally through the slots in the tension member in spaced relation to the ends of said slots to permit axial play therein, the ends of the backing strut being anchored in the valve body, stop means located at the upstream end of the tension member, a helical compression spring extending axially inside the tension member in interposed relation to said stop means and backing strut to restrain the movable valve member against its seat, remote actuation means for the movable valve member, which means includes a corrugated bellows chamber located centrally on the downstream portion of the backing strut, a contact projection provided exteriorly on the downstream end of the said bellows chamber for actuating contact with the inside wall of the movable valve member, and conduit means extending from outside said valve member through the backing strut to the interior of said bellows chamber, whereby fluid pressure may be applied to said chamber.

References Cited in the file of this patent
UNITED STATES PATENTS

| | | |
|---|---|---|
| 287,105 | Cullingworth | Oct. 23, 1883 |
| 636,391 | Smyth et al. | Nov. 7, 1899 |
| 1,539,054 | Meldau | May 26, 1925 |
| 2,316,480 | White | Apr. 13, 1943 |
| 2,915,076 | Teumer | Dec. 1, 1959 |
| 2,974,944 | Terp | Mar. 14, 1961 |